(12) United States Patent
Halvorsen

(10) Patent No.: US 7,026,569 B2  
(45) Date of Patent: Apr. 11, 2006

(54) WELDING MACHINE

(75) Inventor: Arild Halvorsen, Averøy (NO)

(73) Assignee: WelTec AS, Averoy (NO)

( * ) Notice: Subject to any disclaimer, the term of this patent is extended or adjusted under 35 U.S.C. 154(b) by 0 days.

(21) Appl. No.: 10/510,009

(22) PCT Filed: Apr. 2, 2003

(86) PCT No.: PCT/NO03/00107
§ 371 (c)(1),
(2), (4) Date: Oct. 1, 2004

(87) PCT Pub. No.: WO03/082509
PCT Pub. Date: Oct. 9, 2003

(65) Prior Publication Data
US 2005/0224466 A1    Oct. 13, 2005

(30) Foreign Application Priority Data
Apr. 2, 2002   (NO) ................................. 20021557

(51) Int. Cl.
*B23K 9/16*   (2006.01)

(52) U.S. Cl. ........................................ 219/74; 228/219

(58) Field of Classification Search ................. 219/74, 219/75; 228/219
See application file for complete search history.

(56) References Cited

U.S. PATENT DOCUMENTS

| 4,497,019 A | 1/1985 | Waber |
| 5,221,825 A | 6/1993 | Siewert et al. |
| 5,304,776 A * | 4/1994 | Buerkel et al. ............... 219/74 |
| 5,609,782 A | 3/1997 | Kim |
| 6,248,975 B1 | 6/2001 | Lanouette et al. |

FOREIGN PATENT DOCUMENTS

| DE | 3544280 | 6/1987 |
| DE | 3827383 | 2/1990 |
| EP | 0463489 | 1/1992 |
| GB | 2049315 | 12/1980 |

* cited by examiner

*Primary Examiner*—Clifford C. Shaw
(74) *Attorney, Agent, or Firm*—Volpe and Koenig, P.C.

(57) ABSTRACT

The inventive system and method allows the control of shielding gas in an electric welding apparatus having automatic wire feed by controlling the flow rate of the shielding gas as a function of the wire feeding speed and/or the welding current obtained. A control circuit 112 receives an input signal 203 that is representative for the wire feeding speed and/or the welding current, and issues, in response to the input signal 203, a control signal 206 to a controllable flow control valve 110 in a gas supply line 201, 202, 208, which passes shielding gas from a tank 101, via a regulator valve 102, to a discharge nozzle of the welding apparatus welding gun. An adjusting unit 113 provides an operator with an interface which permits adjustment of the parameters that determine the flow rate function.

25 Claims, 7 Drawing Sheets

WELDING MACHINE

FIELD OF INVENTION

The invention relates to systems for the supply of shielding gas to an area in which a welding operation is being carried out, and relates in particular to a control solution which provides control of the shielding gas supply as a function of the actual welding operation.

BACKGROUND

For welding operations in which the actual welding area is to be covered with an inert shielding gas, it is usual to obtain the shielding gas from a supply unit where the gas is at a relatively high pressure. It is therefore usual to install a regulator valve in the supply line in fairly close proximity to the point at which the actual welding apparatus is located, and to control the flow rate by means of a flow valve which is normally fitted on the supply line immediately after the regulator valve. When a wire welding apparatus is used, the welding apparatus will also be equipped with a simple on/off gas supply valve which admits the flow of shielding gas to the welding gun when an operator starts a welding operation, and shuts off the flow of gas to the welding gun when the operator finishes the welding operation. Adjustment of the flow rate is usually made by manual adjustment of the flow valve, and will depend upon a number of factors that are associated with the welding work to be done. These factors may, for example, be the character of the welding wire, the geometry of the welding gun nozzle and/or the welding current the operator is going to use. To achieve a completed welding job of a particular quality, it is of utmost importance that the operator should make the correct adjustment of the regulator valve, and even more important is the correct adjustment of the flow valve. A typical system that is used at present is shown in FIG. 1 of the attached drawings.

Figure 1:
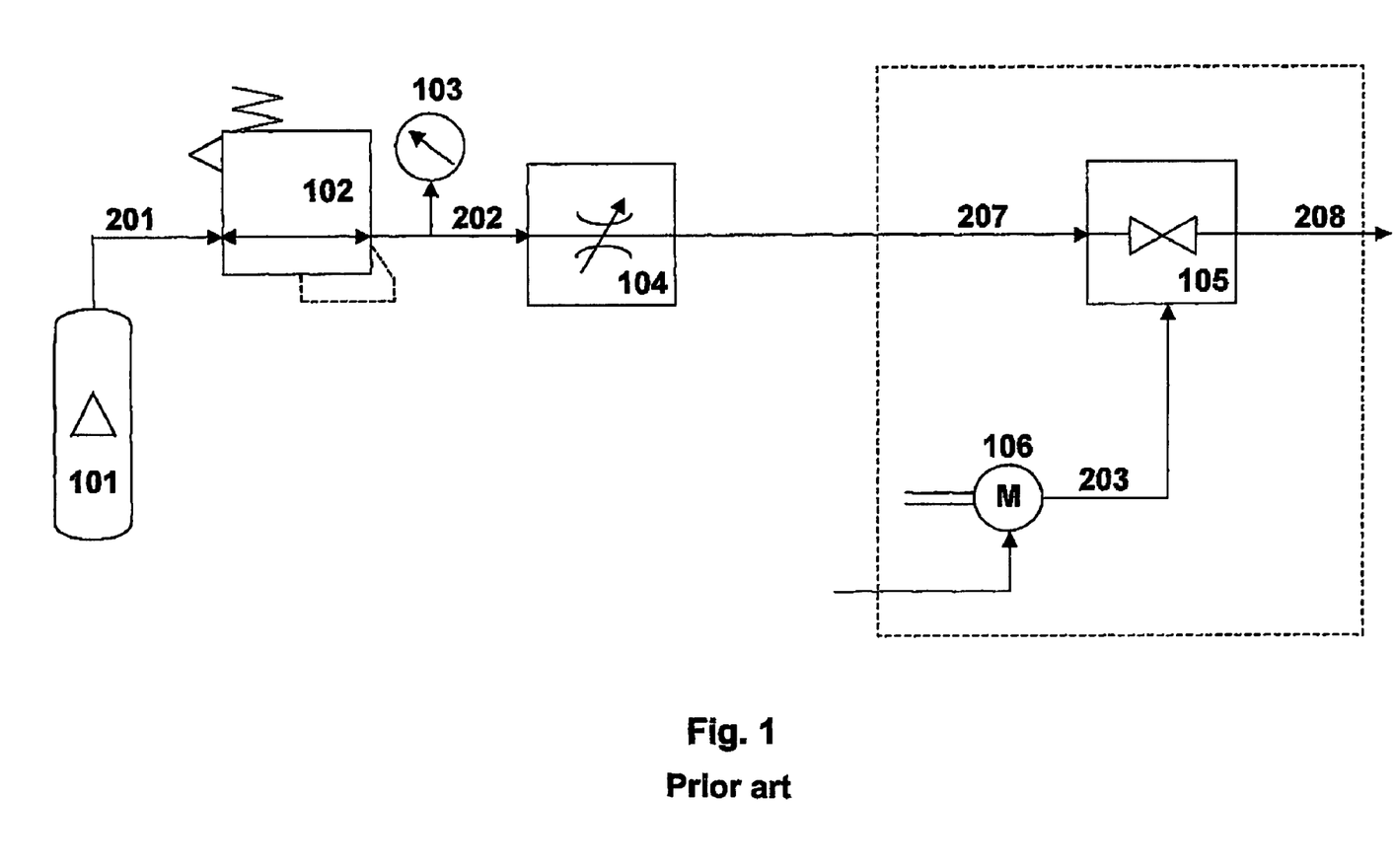
FIG. 1 is a block drawing schematically illustrating a typical known shielding gas delivery system.

As can be seen from FIG. 1, a first length of supply line will typically be located between the gas tank (or gas supply unit) and the point at which the regulator valve and flow valve are located. A second (in this instance substantial) length of supply line will be located between the point at which the regulator valve and the flow valve are located and the position of the gas supply valve (which typically is an integral part of the main unit of the welding apparatus), whilst a third length of supply line will be located between the gas supply valve and the actual welding gun nozzle from where the gas can exit freely in order to flow out over the weld. From this it follows that both before the start of a welding operation and after the completion of a welding operation, an "overpressure" will build up in the second length of the supply line, which "overpressure" corresponds to the pressure set in the regulator valve. When a welding operation is commenced and the gas supply valve opens, this "overpressure" will result in an immediate and forceful emission of gas which, after the "overpressure" has been relieved, will take on a flow rate that is determined by the setting of the flow valve. When the operator has to carry out his welding in the form of many welding operations of short duration, this results in frequent "blow-outs" which cause both a substantial increase in gas consumption and undesirable flow conditions at the gas outlet of the welding gun nozzle.

Another factor that is of importance for the quality of a welding job is that the flow rate is set correctly in relation to other welding parameters, as mentioned above. Whilst carrying out a welding operation, a welding operator will typically make in-process adjustments of settings that affect the feeding speed of the welding wire and/or the value of the welding current. When these parameters are changed, corresponding changes should be made in the shielding gas flow rate. In practice, changes of the shielding gas flow rate are rarely made, partly because the controls for the adjustment of the welding wire feeding speed and/or the welding current are typically located on the main part of the welding apparatus, which in the case of large welding units are often located some distance from the position of the flow valve, and partly because this means yet another operation for the operator. The operator may then for his own convenience first set the flow rate which in any case is high enough to meet all needs, and this in turn may result in the use of an unnecessarily high flow rate and thus an "over-consumption" of the expensive shielding gas.

Patent documents DE 3544280, EP 2860974, U.S. Pat. No. 3,811,027, U.S. Pat. No. 4,278,864, U.S. Pat. No. 5,017,757 and U.S. Pat. No. 5,772,102 all concern techniques that are related to electric welding, and to a varying degree all deal with the problems concerning shielding gas. However, none of these documents seem to disclose the features that characterise the present invention or to address the aforementioned matters by providing a solution that corresponds to any of the solutions of the present invention.

On the basis of the matters mentioned above, there is a need for a solution that will, without any input from the operator, adjust the flow rate of the shielding gas continuously during the performance of a welding job, and control the flow rate of the shielding gas, thereby reducing the total gas consumption.

Accordingly, the object of the invention is to provide solutions whereby improvements of the control of the shielding gas supply in a welding apparatus are obtained.

SUMMARY

The invention provides a control system for controlling the shielding gas supply to a wire welding apparatus, which wire welding apparatus has a wire feed device (106) having a feed signal output which is indicative of a wire feeding speed (U), which wire welding apparatus is connected to a gas tank (101) via a gas supply line (210, 202), in which supply line there may according to choice be arranged a pressure regulator (102) and a manometer (103), which is characterised in that the control system comprises a controllable gas flow valve (110) having a valve inlet, a valve outlet and a valve control signal input, a gas flow sensor (111) having a gas inlet, a gas outlet and a sensor signal output, and a programmable control circuit (112) having a first and a second input and a first output, wherein the gas tank has an inlet connection (201, 202) to the valve inlet, the valve outlet has a valve outlet connection (207) to the gas inlet, the gas outlet has a gas outlet connection (208) to a shielding gas outlet, the feed signal output has a feed signal connection (203) to the first input, the sensor signal output has a sensor signal connection (205) to the second input, the control signal output has a control signal connection (206) to the valve control signal input, and the programmable control circuit comprises a processor which, in accordance with at least one program in a first memory in the control circuit, and on the basis of signals received at the first and second inputs, provides at the first output a valve control signal (Q), which valve control signal has a dynamic range of values limited by a predetermined minimum value (Qmin) and a predetermined maximum value (Qmax).

In one embodiment of the invention, a control system is provided as disclosed above, which is characterised in that the programmable control circuit has a third input, which third input is a communications port for the transfer of the at least one program from a programming device (113), via a communication connection (204), to the memory.

In one embodiment of the invention, a control system is provided as disclosed above, which is characterised in that the program comprises at least one instruction to the processor instructing the processor to issue the valve control signal as a signal that is proportional to a signal representing the difference between the signal at the first input and the signal at the second input.

In one embodiment of the invention, a control system is provided as disclosed above, which is characterised in that the program comprises at least one instruction to the processor instructing the processor to issue the valve control signal as a signal that is proportional to a signal representing the difference between the signal at the first input and the signal at the second input, proportional to a signal representing a time integral of the difference between the signal at the first input and the signal at the second input, and proportional to a signal representing a time derivative of the difference between the signal at the first input and the signal at the second input.

In one embodiment of the invention, a control system is provided as disclosed above, which is characterised in that the program comprises at least one instruction to the processor instructing the processor, from the time the signal at the first input exceeds a first threshold value (Uth1) and in an immediately subsequent first predetermined time period, to issue at the first output a single signal that is constant and having a value which corresponds substantially to the minimum value (Qmin).

In one embodiment of the invention, a control system is provided as disclosed above, which is characterised in that the control circuit comprises a second memory arranged to continuously register the signal value at the first output, and that the program comprises at least one instruction to the processor instructing the processor, from the time the signal at the first input falls short of a second threshold value (Uth2) and in an immediately subsequent second predetermined time period, to issue at the first output a single signal that is constant and having a value that substantially corresponds to the signal value at the time, or immediately prior to the time, when the signal at the first input fell short of the second threshold value.

In one embodiment of the invention, a control system is provided as disclosed above, which is characterised in that the first threshold value (Uth1) is equal to the second threshold value (Uth2).

In one embodiment of the invention, a control system is provided as disclosed above, which is characterised in that the control circuit comprises a control parameter register for storing at least one of the minimum value (Qmin), the maximum value (Qmax), the first threshold value (Uth1), the second threshold value (Uth2), a wire feeding speed minimum threshold (Umin) and a wire feeding speed maximum threshold (Umax); that the program comprises at least one instruction to the processor instructing the processor to set the proportionality so that the control circuit at the first output issues the minimum value (Qmin) when the wire feeding speed (U) corresponds to the wire feeding speed minimum threshold (Umin) and the maximum value (Qmax) when the wire feeding speed (U) corresponds to the wire feeding speed maximum threshold (Umax); and that the program comprises at least one instruction to the processor instructing the processor to issue at the first output the minimum value (Qmin) when the wire feeding speed (U) is below the wire feeding speed minimum threshold (Umin) and the maximum value (Qmax) when the wire feeding speed (U) is above the wire feeding speed maximum threshold (Umax).

In one embodiment of the invention, a control system is provided as disclosed above, which is characterised in that the programmable control circuit has a second output, which second output issues a warning signal when the first output issues the minimum value (Qmin), or when the wire feeding speed (U) is equal to or lower than the wire feeding speed minimum threshold (Umin).

In one embodiment of the invention, a control system is provided as disclosed above, which is characterised in that the programmable control circuit has a second output, which second output issues a warning signal when the first output issues the maximum value (Qmax) or when the wire feeding speed (U) is equal to or higher than the wire feeding speed maximum threshold (Umax).

In one embodiment of the invention, a control system is provided as disclosed above, which is characterised in that the communications port is also arranged for the transfer of control parameters from the programming device (113), via the communication connection (204), to the programmable control circuit.

In one embodiment of the invention, a control system is provided as disclosed above, which is characterised in that the communications port is also arranged for the transfer between the programming device and the programmable control circuit of data stored in, or for storage in, the parameter register and of data representing at least one of a valve control signal (Q), a wire feeding speed (U), and a warning signal.

In one embodiment of the invention, a control system is provided as disclosed above, which is characterised in that the programming device comprises a user interface for the input of control parameters and for the display of data transferred to and from the programmable control circuit.

In one embodiment of the invention, a control system is provided as disclosed above, which is characterised in that the programming device is a personal computer (PC).

The invention provides a method for controlling shielding gas supply to a wire welding apparatus connected to a gas tank (101) via a gas supply line (210, 202), in which supply line there may according to choice be arranged a pressure regulator (102) and a manometer (103), which wire welding apparatus comprises a wire feed device (106) having a feed signal output which is indicative of a wire feeding speed (U), a controllable gas flow valve (110) having a valve inlet, a valve outlet and a valve control signal input, a gas flow sensor (111) having a gas inlet, a gas outlet and a sensor signal output, and a programmable control circuit (112) having a first and a second input and a first output, where the gas tank has an inlet connection (201, 202) to the valve inlet, the valve outlet has a valve outlet connection (207) to the gas inlet, the gas outlet has a gas outlet connection (208) to a shielding gas outlet, the feed signal output has a feed signal connection (203) to the first input, the sensor signal output has a sensor signal connection (205) to the second input, the control signal output has a control signal connection (206) to the valve control signal input, and the programmable control circuit comprises a processor which, in accordance with at least one program in a first memory in the control circuit, and on the basis of signals received at the first and second inputs, provides at the first output a valve control signal (Q), which valve control signal has a dynamic range of values limited by a predetermined minimum value (Qmin) and a predetermined maximum value (Qmax), which is characterised by issuing the valve control signal in the form of a signal that is proportional to a signal representing the difference between the signal at the first input and the signal at the second input.

The invention provides a method for controlling shielding gas supply to a wire welding apparatus connected to a gas tank (101) via a gas supply line (210, 202), in which supply line there may according to choice be arranged a pressure regulator (102) and a manometer (103), which wire welding apparatus comprises a wire feed device (106) having a feed signal output which is indicative of a wire feeding speed (U), a controllable gas flow valve (110) having a valve inlet, a valve outlet and a valve control signal input, a gas flow sensor (111) having a gas inlet, a gas outlet and a sensor signal output, and a programmable control circuit (112) having a first and a second input and a first output, where the gas tank has an inlet connection (201, 202) to the valve inlet, the valve outlet has a valve outlet connection (207) to the gas inlet, the gas outlet has a gas outlet connection (208) to a shielding gas outlet, the feed signal output has a feed signal connection (203) to the first input, the sensor signal output has a sensor signal connection (205) to the second input, the control signal output has a control signal connection (206) to the valve control signal input, and the programmable control circuit comprises a processor which, in accordance with at least one program in a first memory in the control circuit, and on the basis of signals received at the first and second inputs, provides at the first output a valve control signal (Q), which valve control signal has a dynamic range of values limited by a predetermined minimum value (Qmin) and a predetermined maximum value (Qmax), which is characterised by issuing the valve control signal in the form of a signal that is proportional to a signal representing the difference between the signal at the first input and the signal at the second input, proportional to a signal representing a time integral of the difference between the signal at the first input and the signal at the second input, and proportional to a signal representing a time derivative of the difference between the signal at the first input and the signal at the second input.

In one embodiment of the invention, a method is provided as disclosed above, which is characterised by issuing at the first output, from the time the signal at the first input exceeds a first threshold value (Uth1) and in an immediately subsequent first predetermined time period, a single signal that is constant and having a value which corresponds substantially to the minimum value (Qmin).

In one embodiment of the invention, a method is provided as disclosed above, which is characterised by issuing at the first output, from the time the signal at the first input falls short of a second threshold value (Uth2) and in an immediately subsequent second predetermined time period, a single signal that is constant and having a value that substantially corresponds to the signal value at the time, or immediately prior to the time, when the signal at the first input fell short of the second threshold value.

In one embodiment of the invention, a method is provided as disclosed above, which is characterised in that the first threshold value (Uth1) is equal to the second threshold value (Uth2).

In one embodiment of the invention, a method is provided as disclosed above, which is characterised by storing in a control parameter register in the control circuit at least one of the minimum value (Qmin), the maximum value (Qmax), the first threshold value (Uth1), the second threshold value (Uth2), a wire feeding speed minimum threshold (Umin) and a wire feeding speed maximum threshold (Umax); setting the proportionality so that the control circuit at the first output issues the minimum value (Qmin) when the wire feeding speed (U) corresponds to the wire feeding speed minimum threshold (Umin) and the maximum value (Qmax) when the wire feeding speed (U) corresponds to the wire feeding speed maximum threshold (Umax); and issuing at the first output the minimum value (Qmin) when the wire feeding speed (U) is below the wire feeding speed minimum threshold (Umin) and the maximum value (Qmax) when the wire feeding speed (U) is above the wire feeding speed maximum threshold (Umax).

In one embodiment of the invention, a method is provided as disclosed above, which is characterised by issuing at a second output of the programmable control circuit a warning signal when the first output issues the minimum value (Qmin) or when the wire feeding speed (U) is equal to or lower than the wire feeding speed minimum threshold (Umin), or a warning signal when the first output issues the maximum value (Qmax) or when the wire feeding speed (U) is equal to or higher than the wire feeding speed maximum threshold (Umax).

In one embodiment of the invention, a method is provided as disclosed above, which is characterised by transferring control parameters from a programming device (113), via a communication connection (204), to the programmable control circuit.

In one embodiment of the invention, a method is provided as disclosed above, which is characterised by transferring between a programming device (113) and the programmable control circuit, via a communication connection (204), data stored in, or for storage in, the parameter register, and data representing at least one of a valve control signal (Q), a wire feeding speed (U), and a warning signal.

In one embodiment of the invention, a method is provided as disclosed above, which is characterised by entering control parameters and by displaying data transferred to and from the programmable control circuit, by means of a user interface in the programming device.

In one embodiment of the invention, a method is provided as disclosed above, which is characterised in that the programming device is a personal computer (PC).

The invention also provides a welding apparatus, which is characterised in that it comprises a control system according to the inventive control system and embodiments thereof as disclosed above.

BRIEF DESCRIPTION OF THE DRAWINGS

In the following the invention will be explained in more detail with the aid of the attached drawings, wherein.

DETAILED DESCRIPTION OF THE PREFERRED EMBODIMENTS

A typical known solution for a shielding gas delivery system in an arc welding apparatus with automatic wire feed is shown in FIG. 1. The system may be formed of a gas tank 101, a tank line 201, a pressure regulator 102 which lowers the pressure to a pressure that is suitable for further distribution of the gas, a distribution line 202 with a manometer 103, a manually adjustable flow control valve 104 for determining the flow rate, a supply line 207 that passes the shielding gas to the inlet of a gas supply valve 105 in the main unit of the welding apparatus, which is indicated in a broken line, and a feed line 208 which passes the shielding gas from the outlet of the gas supply valve 105 to the nozzle of the welding gun, from where the shielding gas can exit freely to the weld. The gas supply valve 105 is typically a solenoid valve with an open position and a closed position, which is controlled by an electric signal, which signal also starts or stops the motor that feeds the welding wire, and/or switches the welding current on or off. This dependence is indicated by the connection 203 from the wire feed motor 106 to the gas supply valve 105. From the illustration in FIG. 1, it can be seen that when the gas supply valve 105 is closed, gas will flow from the line 202 to the line 207 until the pressure in the two lines is equal. When the gas supply valve 105 is opened, accumulated gas in the line 207 will flow out in a forceful spurt until the pressure difference between the two lines is sufficient for the flow valve 104 to provide a uniform gas flow.

Figure 2:
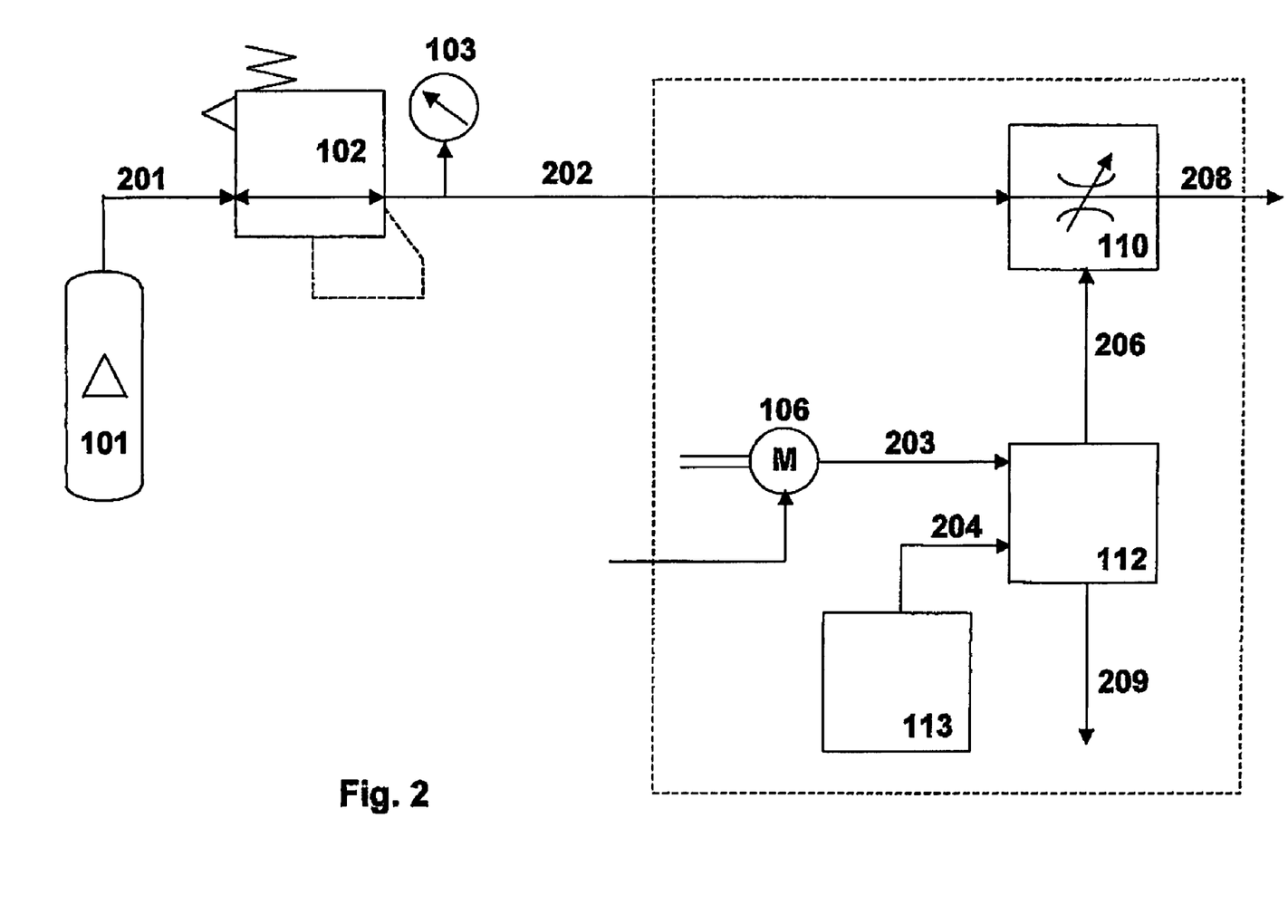
FIG. 2 is a block drawing schematically illustrating a first embodiment of a shielding gas delivery system which comprises the present invention.

A first embodiment of the shielding gas delivery system according to the invention is shown in a block diagram in FIG. 2. The part of the gas supply system that is not associated with the welding apparatus consists of the gas tank 101, the tank line 201, the pressure regulator 102, and the distribution line 202 with the manometer 103, whilst the part of the system that is associated with the welding apparatus includes a controllable flow control valve 110, a control unit 112 that has a control connection 206 to the flow control valve 110 and connections to the wire feed motor or its control circuit, and/or to a welding current control circuit. The control unit 112 is also provided with an input connection 204 for connection to an adjusting device 113 for the adjustment of different control parameters. The control unit 112 reacts to a varying input signal at the input connection 204 by issuing an output signal at the control connection 206 which varies as a function of the input signal. In its simplest form, the output signal varies in direct ratio to the input signal, which gives the result that the gas flow rate in the line 208 will vary in direct ratio to the input signal, although within the limits that are obtainable in view of the largest and smallest capacities of the different lines and the valves, and the setting of the pressure regulator 102. The proportionality factor may be set by means of the adjusting device 113, which for a microprocessor-based control unit 112 typically will be a data terminal, a personal computer or a similar device. The solution shown in FIG. 2 requires a relatively good repeatability in the relation between the output signal at the control connection 206 and the gas flow rate that is actually obtained in the feed line 208, which, among other factors, will be dependent upon the setting of the pressure regulator 102. However, a solution of this kind, especially if formed of low-cost components, will require relatively frequent calibration and checking.

It has been found in practice that some controllable flow control valves over time give great variations in the flow rate, chiefly as a consequence of pressure variations, temperature and wear.

Figure 3:
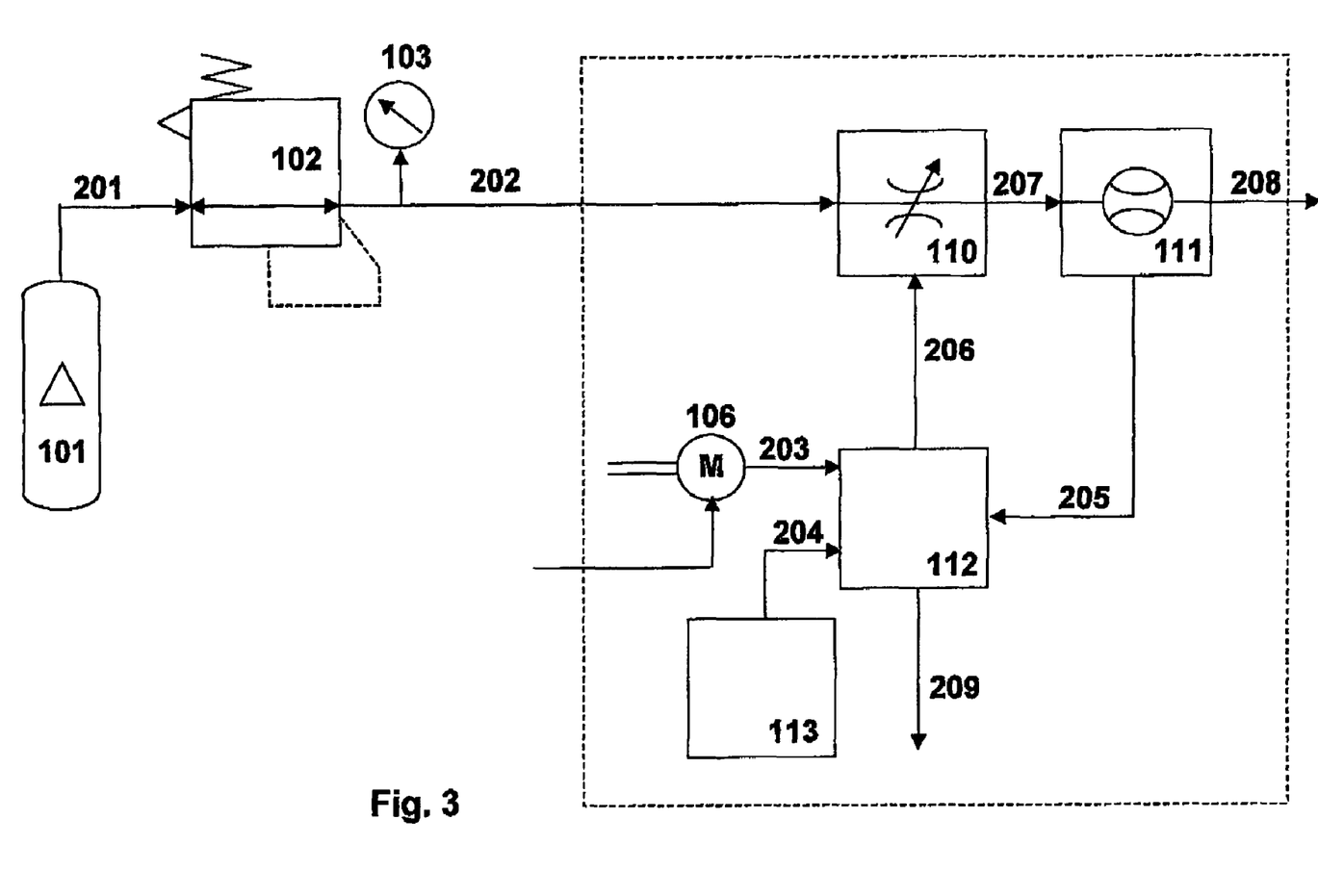
FIG. 3 is a block drawing schematically illustrating a second embodiment of a shielding gas delivery system which comprises the present invention.

With reference to the block-diagram presentation in FIG. 3, there will now follow a description of a second embodiment of a shielding gas delivery system according to the invention, which gives a better performance as regards repeatability and accuracy of the flow rate in the feed line 208. Broadly, the solution comprises the same solution as described above with reference to FIG. 2, but comprises in addition a flow sensor 11 that is installed in the gas supply line between the controllable flow control valve 110 and the feed line 208. The flow sensor 111 has a signal output which issues a signal that is indicative of the gas flow which at any given time flows through the flow sensor 111. The signal output of the flow sensor 111 is connected via the connection 205 to a corresponding signal input on the control unit 112, so that a feedback loop is formed via the connection 206, the controllable flow control valve 110 and the connection 207 to the flow sensor 111. This requires that the flow sensor 111 has sufficient accuracy and repeatability. In a simple embodiment of the control unit 112 in this constellation, a control signal is issued at the connection 206 which consists of a signal that is proportional to the input signal at the connection 203 with the addition of a correction signal that results from the difference between a first signal derived from the signal at the connection 203 and a second signal derived from the signal at the connection 205. However, the correction signal may also be generated by means of a PID (Proportional, Integrating and Deriving) controller in the control unit 112 in order to obtain a rapid response, good stability and high follow-up accuracy. Thus, it is assured that the actual gas flow in the line 208 at all times and without significant deviations follows a predetermined proportionality factor of the input signal at the connection 203. This solution also eliminates the need for frequent checking and calibration.

In the two embodiments described above with reference to FIGS. 2 and 3, the input signal at the connection 203 represents a varying signal that is representative for the actual wire feeding speed and/or the welding current prevailing at any given time. In practice, the main unit of a welding apparatus may comprise an electric direct-current motor that assures the wire feed, and the voltage supplied to the motor will therefore be representative of the wire feeding speed and could be used directly as the input signal at the connection 203 to the control unit 112. In typical electric welding apparatus, there will be dependence between wire feeding speed and welding current, and for apparatus of this kind it is not important for the invention whether the operator's adjustments of the apparatus during the performance of a welding job are made to the wire feeding speed or to the welding current.

Figure 4:
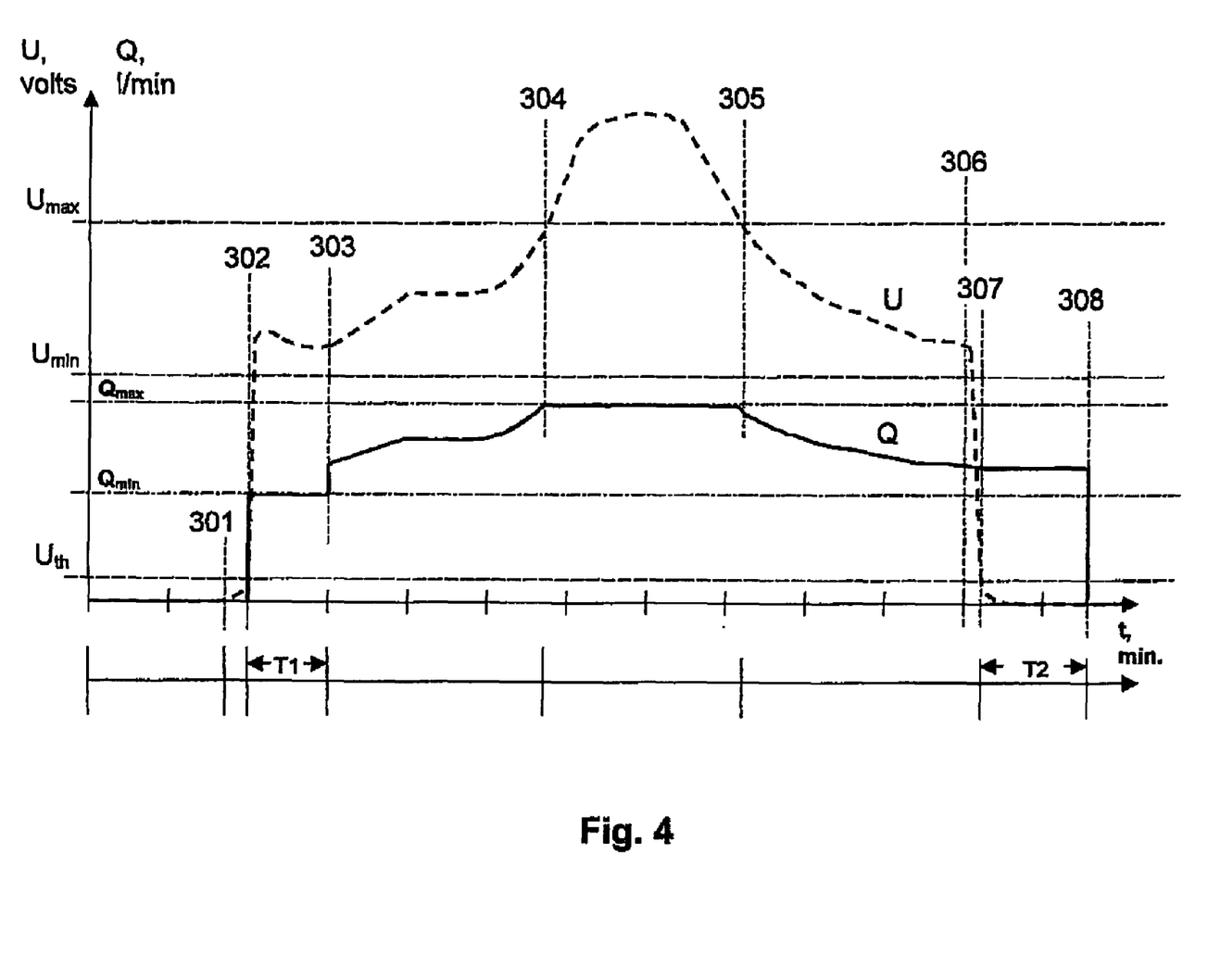
FIG. 4 is a graph illustrating a time sequence example for control signals and shielding gas flow rate in a shielding gas delivery system which comprises the present invention.

With reference to the graph in FIG. 4, there will now be described by means of an example a gas flow course in a shielding gas supply system according to the invention during the performance of a welding job where the operator makes adjustments to the wire feeding speed (or the welding current) during the performance of a welding operation. U indicates direct current, illustrated in a broken line, which is supplied to a wire feed motor and which determines the wire feeding speed, whilst Q indicates the gas flow, illustrated in a solid line, which flows in the feed line to the welding gun nozzle. At time 301, the operator depresses the trigger switch on the welding gun, which results in voltage being supplied to the wire feed motor. The motor voltage, and speed, increase rapidly and at the time 302 pass a first threshold Uth at which the control unit 112 is activated. When activated, the control unit 112 issues a constant control signal which indicates a constant minimum flow rate during a time period T1. At the time 303, which is at the end of the time period T1, the control unit 112 issues a control signal to the flow control valve 110 which assures a gas flow that varies proportionally to the control signal, i.e., proportionally to the motor voltage, and thus also proportionally to the wire feeding speed. However, the operator has set a maximum flow rate Qmax that should be coincident with a maximum voltage Umax, and a minimum flow rate Qmin which should be coincident with a minimum voltage Umin. As the operator adjusts the wire feeding speed during the welding operation, the motor voltage U exceeds the maximum voltage Umax at the time 304, and the flow rate Q of the gas is therefore maintained constant at Qmax until the time 305 when the motor voltage has again been adjusted to a value that is less than Umax. From the time 305, the flow rate Q of the gas again varies proportionally to the feeding speed (represented by U), as set by the operator, until the operator, at the time 306, releases the trigger on the welding gun, with the result that the motor voltage U drops quickly and falls below the threshold voltage Uth at the time 307. The control unit 112 registers that the voltage U falls below the threshold Uth, and will at the time 307, depending on the parameter settings of the control unit 112, either assure the immediate shut-off of the gas flow by deactivation of the control unit 112, or by means of a memory in the control unit 112 maintain the gas flow at a flow rate Q, which corresponds to the rate that was present at the time 306, for a time period T2 until the time 308, whereupon the control unit 112 is deactivated.

Figure 5:
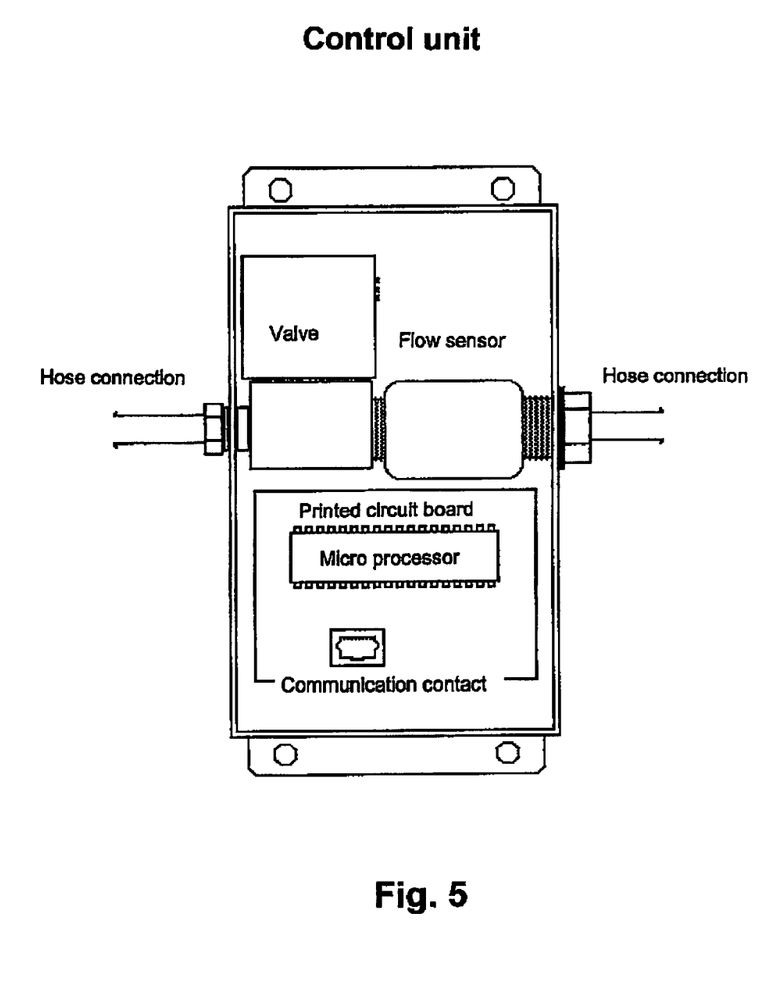
FIG. 5 is a rough illustration of a possible embodiment of the control unit according to the second embodiment shown in FIG. 3, for incorporation into the main unit of a wire welding apparatus for control of the shielding gas flow rate in a shielding gas delivery system which comprises the present invention.
Figure 6:
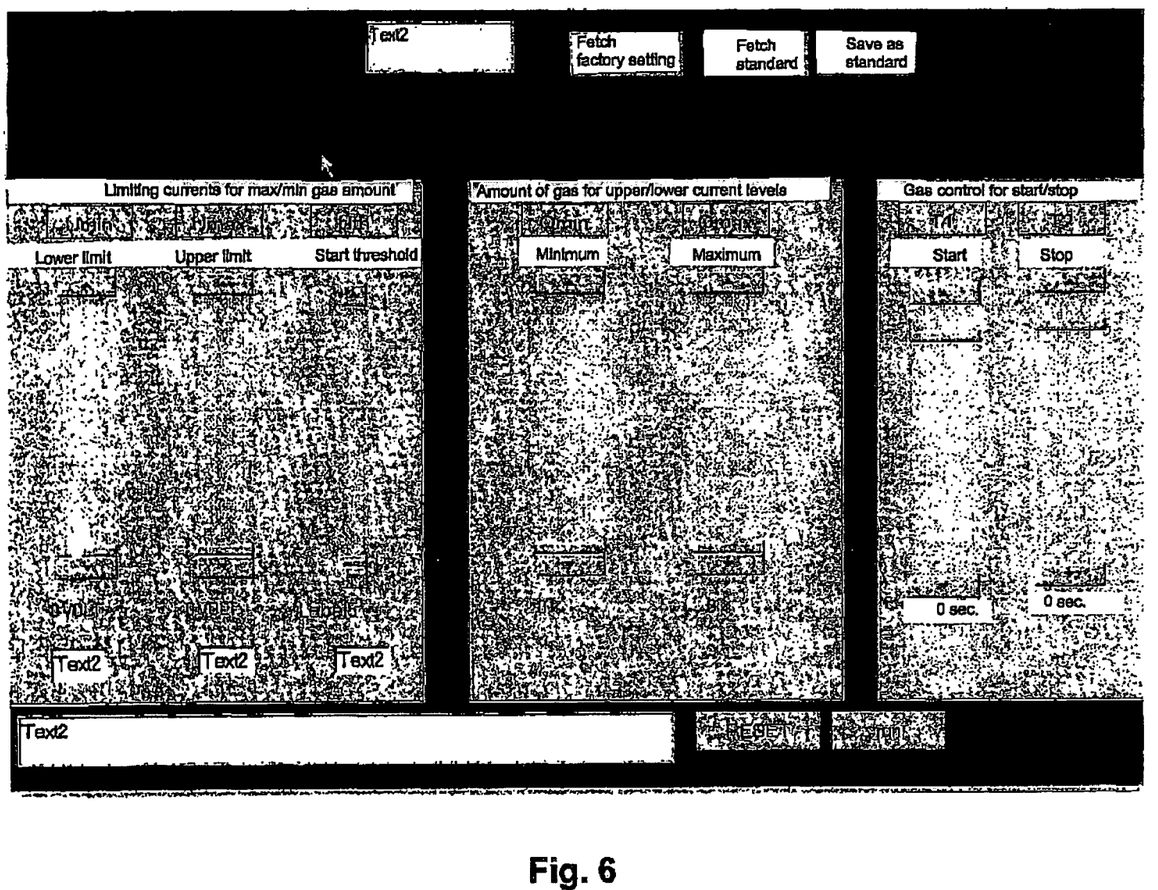
FIG. 6 is an illustration of a user interface when a personal computer is used to set different control parameters for a possible embodiment of a processor-equipped control unit for control of the shielding gas flow rate in a shielding gas delivery system which comprises the present invention.
Figure 7:
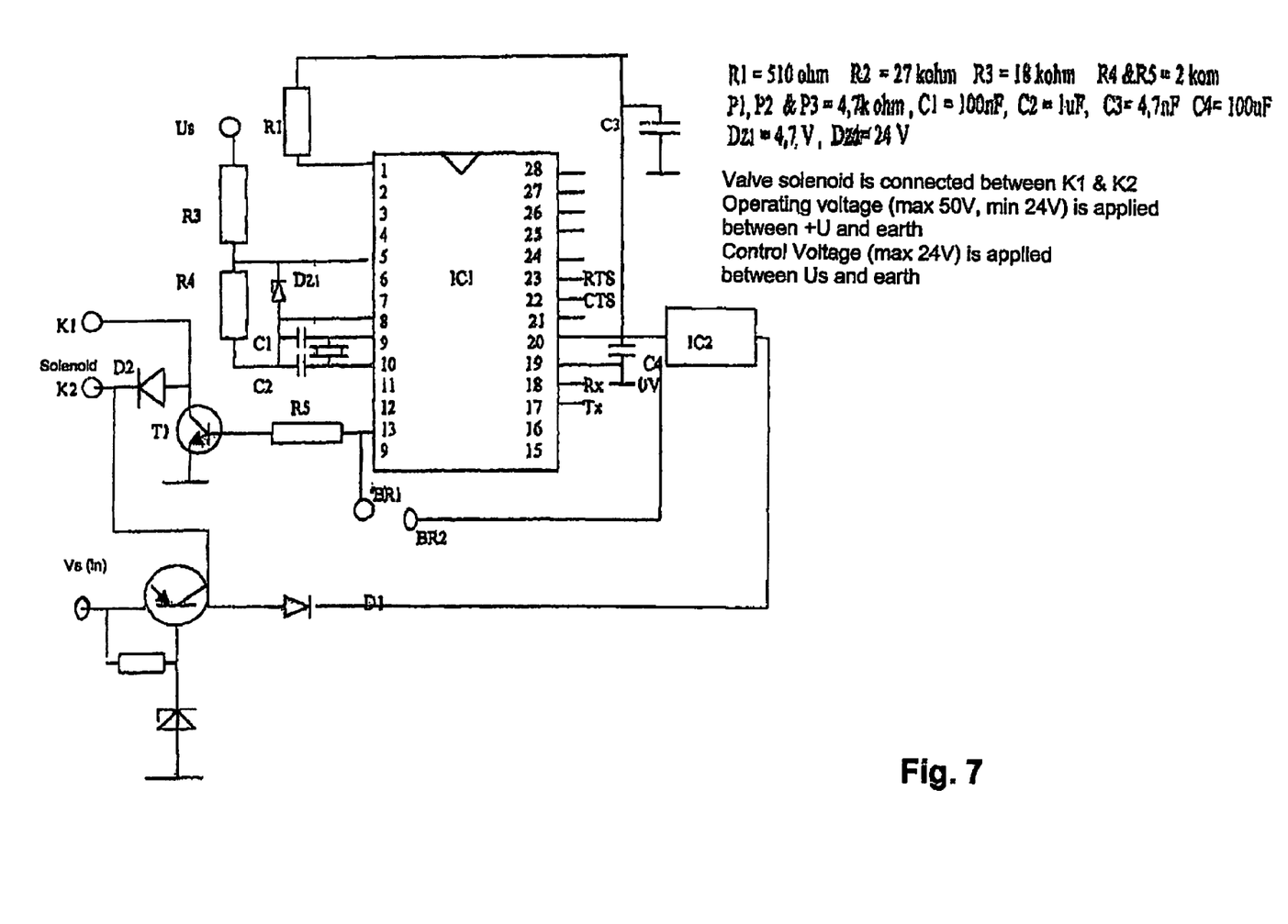
FIG. 7 is a circuit diagram for the electronic part of a possible embodiment of a processor-equipped control unit for control of the shielding gas flow rate in a shielding gas delivery system which comprises the present invention.

With reference to FIG. 6, seen in conjunction with FIG. 5, there is shown an example of a user interface in connection with the adjusting device consisting of a personal computer. With reference to the explanation of FIG. 5 above, the reader will again recognise the possible adjustments for the maximum voltage Umax, the minimum voltage Umin, the threshold voltage Uth, the maximum flow rate Qmax, the minimum flow rate Qmin, the start pulse time period T1 and the stop pulse time period T2. By comparing FIGS. 5 and 6, it will be seen that for the illustrated example in FIG. 4, the proportionality factor between the input signal (wire feeding speed) at the connection 203 and the control signal (flow rate) at the connection 206 is determined by the settings for Umin and Qmin, and Umax and Qmax.

Although the invention has been explained with all settings for Umin, Umax, Uth, Qmin, Qmax, T1 and T2 set as values that make them active during the performance of the welding operation example explained above, the invention can also be carried out in such manner that one or more of these parameters may be omitted. For example, it is conceivable that some welding apparatus will never be used to perform welding operations which make it necessary to use an "afterflow" of gas during a time period T2, in which case this control parameter can be completely omitted, both as functionality in the control unit 112, and in the interface in an adjusting means 113.

More generally, the relation between the input signal (wire feeding speed, or welding current) to and the control signal (the flow rate) from the control unit 112 is described by the expression:

$$Q=f(U).$$

Thus, the relation between input signal and control signal does not need to be proportional or linear, as there could be other important factors for the welding job which may require another dependence. By using a microprocessor, or a microcontroller, in the control unit 112, the implementation of the majority of conceivable relations will be to solve relatively simple program-technical tasks.

The control unit 112 can also be provided with both standard settings and tables for other settings and parameters, depending upon factors such as the wire type used, the material to be welded, gas type, ambient conditions and so forth. Through a logically constructed interface, the operator will easily be able to reset both the apparatus and the shielding gas supply, which in turn will mean better economy and a greater certainty that the result of a welding operation has the desired quality.

In one embodiment of a shielding gas delivery system according to the invention, the flow control valve 111 consists of an electric pulsed valve means. The control signal to the flow control valve 111 will in this case be a pulse train with varying frequency and/or pulse factor as a function of the input signals to the control unit 112.

In FIGS. 2 and 3, the control unit 112 is provided with an output connection 209. This is an optional output connection which could carry one or more warning or indicator signals that may be useful during the performance of a welding operation. For example, the control unit 112 may issue a warning signal that tells the operator that the flow rate has reached the maximum value Qmax, or for example, in the case of the constellation in FIG. 2, that the correction signal derived from the signal from the flow sensor 111 is not capable of correcting a deviation, with the result that the flow rate will deviate from the desired value. The last-mentioned case could occur, for example if the gas tank runs empty during the performance of a welding operation.

Although the invention has been explained using examples that essentially use electric signals between the different elements, the invention could be realised using other types of signals carriers, as for instance by using pneumatic, hydraulic, optical or mechanical means for signal transmission. Optionally, a combination of different signals could be used, as for instance an electric input signal to the control unit 112 at the connection 203, and a pneumatic control signal from the control unit 112 to the flow control valve 110 at the connection 206.

What is claimed is:

1. A control system for controlling the shielding gas supply of an automatic welding apparatus, which automatic welding apparatus has a continuous electrode feed device having a feed signal output which is indicative of a continuous electrode feeding speed (U), which automatic welding apparatus is connected to a gas tank via a gas supply line, in which supply line there may according to choice be arranged a pressure regulator and a manometer characterised in that the control system comprises a controllable gas flow valve having a valve gas inlet, a valve gas outlet and a valve control signal input for receiving a valve control signal;

a gas flow sensor having a gas inlet, a gas outlet and a sensor signal output; and a programmable control circuit having a first and a second input and a first output; wherein the gas tank has an inlet connection to the valve gas inlet, the valve gas outlet has a valve outlet connection to the gas inlet, the gas outlet has a gas outlet connection to a shielding gas outlet, the feed signal output has a feed signal connection to the first input, the sensor signal output has a sensor signal connection to the second input, the first output has a control signal connection to the valve control signal input, the programmable control circuit comprises a processor which, in accordance with at least one program in a first memory in the control circuit, and on the basis of signals received at the first and second inputs, provides at the first output the valve control signal, which provided valve control signal is adjustable by means of the programmable control circuit within a dynamic range of values limited in accordance with a predetermined minimum gas flow (Qmin) through the valve and a predetermined maximum gas flow (Qmax) through the valve, and the program comprises at least one instruction to the processor instructing the processor to issue at the first output a signal that is constant and having a value which corresponds substantially to the minimum gas flow (Qmin) through the valve from the time the signal at the first input exceeds a first threshold value (Uth1) and in an immediately subsequent first predetermined time period.

2. The control system of claim 1, characterised in that the programmable control circuit has a third input, said third input is a communications port for the transfer of the at least one program from a programming device, via a communication connection, to the memory.

3. The control system of claim 2,
characterised in that the first threshold value (Uth1) is equal to a second threshold value (Uth2).

4. The control system of claim 2,
characterised in that the communications port is also arranged for the transfer of control parameters from the programming device, via the communication connection, to the programmable control circuit.

5. The control system of claim 2,
characterised in that the communications port is also arranged for the transfer between the programming device and the programmable control circuit of data stored in, or for storage in, the parameter register and of data representing at least one of a valve control signal, a feeding speed (U), and a warning signal.

6. The control system of claim 2,
characterised in that the programming device comprises a user interface for the input of control parameters and for the display of data transferred to and from the programmable control circuit.

7. The control system of claim 2
characterised in that the programming device is a personal computer (PC).

8. The control system of claim 1, characterised in that the program comprises at least one instruction to the processor instructing the processor to issue the valve control signal as a signal that is proportional to a signal representing the difference between the signal at the first input and the signal at the second input.

9. The control system of claim 1, characterised in that the program comprises at least one instruction to the processor instructing the processor to issue the valve control signal as a signal that is proportional to a signal representing the difference between the signal at the first input and the signal at the second input, proportional to a signal representing a time integral of the difference between the signal at the first input and the signal at the second input, and proportional to a signal representing a time derivative of the difference between the signal at the first input and the signal at the second input.

10. A method for controlling a shielding gas supply in an automatic welding apparatus by means of the control system of claim 1, the method characterised by
outputting the valve control signal at the first output in the form of a signal that is proportional to a signal representing a difference between the signal at the first input and the signal at the second input, and outputting at the first output the valve control signal as a signal that is constant and having a value which corresponds substantially to the minimum gas flow (Qmin) through the valve from the time the signal at the first input exceeds a first threshold value (Uth1) and in an immediately subsequent first predetermined time period.

11. A method for controlling a shielding gas supply in an automatic welding apparatus by means of the control system of claim 1, the method characterised by
outputting the valve control signal at the first output in the form of a signal that is proportional to a signal representing the difference between the signal at the first input and the signal at the second input, and
outputting at the first output, from the time that the signal at the first input fall short of a second threshold value (Uth2) and in an immediately subsequent second predetermined time period, the valve control signal as a signal that is constant and having a value that substantially corresponds to the signal value at the time, or immediately prior to the time, when the signal at the first input fell short of the second threshold value.

12. The method of claim 11, characterised in that the first threshold value (Uth1) is equal to the second threshold value (Uth2).

13. The method claim 11, characterised by storing in a control parameter register in the control circuit at least one of the minimum gas flow (Qmin) through the valve, the maximum gas flow (Qmax) through the valve, the first threshold value (Uth1), the second threshold value (Uth2), a continuous electrode feeding speed minimum threshold (Umin) and a continuous electrode feeding speed maximum threshold (Umax);
setting a proportionality so that the control circuit at the first output issues the valve control signal in accordance with minimum gas flow (Qmin) through the valve when the continuous electrode feeding speed (U) corresponds to the wire feeding speed minimum threshold (Umin) and the maximum gas flow (Qmax) through the valve when the wire feeding speed (U) corresponds to the wire feeding speed maximum threshold (Umax); and
by issuing at the first output the valve control signal in accordance with the minimum gas flow (Qmin) through the valve when the wire feeding speed (U) is below the feeding speed minimum threshold (Umin) and the maximum gas flow (Qmax) through the valve when the feeding speed (U) is above the feeding speed maximum threshold (Umax).

14. The method of claim 11, characterised by issuing at a second output of the programmable control circuit a warning signal when the first output issues the valve control signal in accordance with the minimum gas flow (Qmin) through the valve or when the feeding speed (U) is equal to or lower than the feeding speed minimum threshold (Umin), or a warning signal when the first output issues the valve control signal in accordance with the maximum gas flow (Qmax) through the valve or when the feeding speed (U) is equal to or higher than the wire feeding speed maximum threshold (Umax).

15. The method of claim 11, characterised by transferring control parameters, from a programming device via a communication connection to the programmable control circuit.

16. The method, of claim 11 characterised by transferring between a programming device and the programmable control circuit, via a communication connection, data stored, or for storage in the parameter register, and data representing at least one of a valve control signal, a feeding speed (U), and a warning signal.

17. The method of claim 16, characterised by entering control parameters and by displaying data transferred to and from the programmable control circuit, by means of a user interface in the programming device.

18. The method of claim 16, characterised in that the programming device is a personal computer (PC).

19. A method for controlling a shielding gas supply in an automatic welding apparatus by means of the control system of claim 1, the method characterised by
outputting the valve control signal at the first output in the form of a signal that is proportional to a signal representing the difference between the signal at the first input and the signal at the second input, proportional to a signal representing a time integral of the difference between the signal at the first input and the signal at the second input, and proportional to a signal representing a time derivative of the difference between the signal at the first input and the signal at the second input, and
outputting at the first output the valve control signal as a signal that is constant and having a value which corresponds substantially to the minimum gas flow (Qmin) through the valve from the time that the signal at the first input exceeds a first threshold value (Uth1) and in an immediately subsequent first predetermined time period.

20. A method for controlling a shielding gas supply in an automatic welding apparatus by means of the control system of claim 1, the method characterised by
outputting the valve control signal at the first output in the form of a signal that is proportional to a signal representing the difference between the signal et the first input and the signal at the second input, proportional to a signal representing a time integral of the difference between the signal at the first input and the signal at the second input, and proportional to a signal representing a time derivative of the difference between the signal at the first input and the signal at the second input, and
outputting at the first output, from the time that the signal at the first input falls short of a second threshold value (Uth2) and in a immediately subsequent second predetermined time period, the valve control signal as a signal that is constant and having a value that substantially corresponds to the signal value at the time, or immediately prior to the time, when the signal at the first input fell short of the second threshold value.

21. A welding apparatus, characterised in that it comprises the control system of claim 1.

22. A control system for controlling the shielding gas supply of an automatic welding apparatus, which automatic welding apparatus has a continuous electrode feed device having a feed signal output which is indicative of a continuous electrode feeding speed (U), which automatic welding apparatus is connected to a gas tank via a gas supply line, in which supply line there may according to choice be arranged a pressure regulator and a manometer
characterised in that the control system comprises
a controllable gas flow valve having a valve gas inlet, a valve gas outlet and a valve control signal input for receiving a valve control signal;
a gas flow sensor having a gas inlet, a gas outlet and a sensor signal output; and
a programmable control circuit having a first and a second input and a first output;
wherein the gas tank has an inlet connection to the valve gas inlet, the valve gas outlet has a valve outlet connection to the gas inlet, the gas outlet has a gas outlet connection to a shielding gas outlet, the feed signal output has a feed signal connection to the first input, the sensor signal output has a sensor signal connection to the second input, the first output has a control signal connection to the valve control signal input,
the programmable control circuit comprises a processor which, in accordance with at least one program in a first memory in the control circuit, and on the basis of signals received at the first and second inputs, provides at the first output the valve control signal, which provided valve control signal is adjustable by means of the programmable control circuit within a dynamic range of values limited in accordance with a predetermined minimum gas flow (Qmin) through the valve and a predetermined maximum gas flow (Qmax) through the valve, and
the control circuit comprises a second memory arranged to continuously register
the signal value at the first output of the control circuit; and
that the program comprises at least one instruction to the processor instructing the processor issue at the first output from the time the signal at the first input falls short of a second threshold value (Uth2) and in an immediately subsequent second predetermined time period signal that is constant and having a value that substantially corresponds to the signal value at the time, or immediately prior to the time, when the signal at the first input fell short of the second threshold value.

23. The control system of claim 22,
characterised in that the control circuit comprises a control parameter register for storing at least one of the minimum gas flow (Qmin) through the valve, the maximum gas flow (Qmax) through the valve, a first threshold value (Uth1), the second threshold value (Uth2), a continuous electrode feeding speed minimum threshold (Umin) and a continuous electrode feeding speed maximum threshold (Umax),
that the program comprises at least one instruction to the processor instructing the processor to set a proportionality so that the control circuit at the first output issues the valve control signal in accordance with minimum value (Qmin) when the feeding speed (U) corresponds to the feeding speed minimum threshold (Umin) and in accordance with the maximum value (Qmax) when the feeding speed (U) corresponds to the feeding speed maximum threshold (Umax); and
that the program comprises at least one instruction to the processor instructing the processor to issue at the first output the valve control signal in accordance with the minimum gas flow (Qmin) through the valve when the continuous electrode feeding speed (U) is below the feeding speed minimum threshold (Umin) and the valve control signal in accordance with the maximum gas flow (Qmax) through the valve when the feeding speed (U) is above the feeding speed maximum threshold (Umax).

24. The control system of claim 23,
characterised in that the programmable control circuit has a second output that issues a warning signal when the first output issues the valve control signal in accordance with the minimum gas flow (Qmin) through the valve or when the feeding speed (U) is equal to or lower than the feeding speed minimum threshold (Umin).

25. The control system of claim 23,
characterised in that the programmable control circuit has a second output that issues a warning signal when the first output issues the valve control signal in accordance with the maximum gas flow (Qmax) through the valve or when the feeding speed (U) is equal to or higher than the feeding speed maximum threshold (Umax).

* * * * *